(12) United States Patent
Carroll

(10) Patent No.: US 8,938,102 B2
(45) Date of Patent: *Jan. 20, 2015

(54) METHODS AND APPARATUS FOR ASSESSING ACTIVITY OF AN ORGAN AND USES THEREOF

(75) Inventor: Robert G. Carroll, Largo, FL (US)

(73) Assignee: Quantitative Imaging, Inc., Largo, FL (US)

(*) Notice: Subject to any disclaimer, the term of this patent is extended or adjusted under 35 U.S.C. 154(b) by 267 days.

This patent is subject to a terminal disclaimer.

(21) Appl. No.: 13/495,222

(22) Filed: Jun. 13, 2012

(65) Prior Publication Data

US 2012/0321152 A1    Dec. 20, 2012

Related U.S. Application Data

(63) Continuation of application No. 13/494,429, filed on Jun. 12, 2012, which is a continuation of application No. 13/494,262, filed on Jun. 12, 2012.

(60) Provisional application No. 61/498,243, filed on Jun. 17, 2011.

(51) Int. Cl.
*G06K 9/00* (2006.01)
*G06T 7/00* (2006.01)

(52) U.S. Cl.
CPC ..... *G06T 7/0014* (2013.01); *G06T 2207/10104* (2013.01); *G06T 2207/30016* (2013.01)
USPC ........... 382/128; 382/131; 600/407; 600/410; 600/411

(58) Field of Classification Search
CPC ........... G06T 2207/10104; G06T 2207/30016; G06T 7/0014; G06T 1/2985; G06T 1/1642
USPC .......... 600/407, 411, 425, 410; 382/131, 128
See application file for complete search history.

(56) References Cited

U.S. PATENT DOCUMENTS

| 4,881,032 A | 11/1989 | Bottomley et al. |
|---|---|---|
| 4,922,915 A | 5/1990 | Arnold et al. |
| 5,225,781 A | 7/1993 | Glover et al. |
| 5,844,241 A * | 12/1998 | Liu et al. .......... 250/363.04 |
| 6,546,275 B2 | 4/2003 | Carroll |
| 6,631,203 B2 | 10/2003 | Ellis et al. |
| 7,088,854 B2 | 8/2006 | Cotman et al. |
| 7,315,639 B2 | 1/2008 | Kuhnigk |
| 7,558,611 B2 | 7/2009 | Arnold et al. |
| 7,692,424 B2 | 4/2010 | Cheng et al. |
| 7,702,141 B2 | 4/2010 | Sirohey et al. |
| 7,747,308 B2 | 6/2010 | Hundley et al. |
| 7,813,538 B2 | 10/2010 | Carroll et al. |
| 7,848,557 B2 | 12/2010 | Kadrmas et al. |
| 7,860,331 B2 | 12/2010 | Lal et al. |

(Continued)

OTHER PUBLICATIONS

Ashburner J et al., entitled "Voxel-Based Morphometry—The Methods," NeuroImage 11, 2000, 805-821.

(Continued)

*Primary Examiner* — Baisakhi Roy
(74) *Attorney, Agent, or Firm* — Amster, Rothstein & Ebenstein LLP

(57) ABSTRACT

Methods and apparatus are provided for imaging activity of an organ of a subject for diagnosis and prognosis of pathology or injury to the organ, where unaffected portions of the organ are used as a reference for assessing activity of afflicted areas of the organ.

24 Claims, 8 Drawing Sheets

(56) References Cited

U.S. PATENT DOCUMENTS

| | | | |
|---|---|---|---|
| 7,885,442 B2 | 2/2011 | Lorenz et al. | |
| 7,907,759 B2 | 3/2011 | Hundley et al. | |
| 7,978,897 B2 | 7/2011 | Yamagata et al. | |
| 8,032,335 B2 | 10/2011 | Martin et al. | |
| 8,125,484 B2 | 2/2012 | Gering | |
| 8,218,835 B2 | 7/2012 | Matsuda et al. | |
| 8,369,590 B2 | 2/2013 | Wang et al. | |
| 2003/0036083 A1 | 2/2003 | Tamez-Pena et al. | |
| 2003/0045791 A1 | 3/2003 | Carroll | |
| 2004/0258285 A1 | 12/2004 | Hansen et al. | |
| 2005/0017972 A1 | 1/2005 | Poole et al. | |
| 2005/0054910 A1* | 3/2005 | Tremblay et al. | 600/411 |
| 2005/0085705 A1* | 4/2005 | Rao et al. | 600/345 |
| 2005/0113680 A1 | 5/2005 | Ikeda et al. | |
| 2005/0271297 A1 | 12/2005 | Zbilut et al. | |
| 2005/0273017 A1 | 12/2005 | Gordon | |
| 2006/0044304 A1 | 3/2006 | Sirohey et al. | |
| 2006/0052685 A1 | 3/2006 | Cho et al. | |
| 2006/0114254 A1 | 6/2006 | Day et al. | |
| 2006/0241382 A1 | 10/2006 | Li et al. | |
| 2006/0241718 A1 | 10/2006 | Tyler et al. | |
| 2007/0081712 A1 | 4/2007 | Huang et al. | |
| 2007/0127794 A1 | 6/2007 | Niogi et al. | |
| 2007/0253910 A1 | 11/2007 | Ahrens et al. | |
| 2008/0021502 A1 | 1/2008 | Imielinska et al. | |
| 2008/0119720 A1 | 5/2008 | Carroll et al. | |
| 2008/0194943 A1 | 8/2008 | Lorenz et al. | |
| 2008/0260222 A1 | 10/2008 | Kumar et al. | |
| 2008/0317314 A1 | 12/2008 | Schwartz et al. | |
| 2009/0076373 A1 | 3/2009 | Maschke | |
| 2009/0112081 A1 | 4/2009 | Yu et al. | |
| 2009/0129661 A1 | 5/2009 | Licato | |
| 2009/0129671 A1 | 5/2009 | Hu et al. | |
| 2009/0226064 A1 | 9/2009 | El Fakhri et al. | |
| 2009/0252391 A1 | 10/2009 | Matsuda et al. | |
| 2009/0297008 A1 | 12/2009 | Taxt et al. | |
| 2009/0297015 A1 | 12/2009 | Jetzek | |
| 2009/0318794 A1* | 12/2009 | DeCharms | 600/410 |
| 2010/0142785 A1 | 6/2010 | Dahnke et al. | |
| 2010/0142841 A1 | 6/2010 | Vaidya et al. | |
| 2010/0156898 A1 | 6/2010 | Voros et al. | |
| 2010/0166270 A1 | 7/2010 | Wiemker et al. | |
| 2010/0191541 A1 | 7/2010 | Prokoski | |
| 2010/0256504 A1 | 10/2010 | Moreau-Gaudry et al. | |
| 2010/0259263 A1 | 10/2010 | Holland et al. | |
| 2010/0266190 A1 | 10/2010 | Zagorchev et al. | |
| 2010/0272340 A1 | 10/2010 | Bar-Aviv et al. | |
| 2010/0322490 A1 | 12/2010 | Pan et al. | |
| 2011/0044524 A1 | 2/2011 | Wang et al. | |
| 2011/0054295 A1 | 3/2011 | Masumoto et al. | |
| 2011/0077503 A1 | 3/2011 | Bonilha et al. | |
| 2011/0105881 A1 | 5/2011 | Kakimoto et al. | |
| 2011/0150309 A1 | 6/2011 | Barfett et al. | |
| 2011/0160543 A1* | 6/2011 | Parsey et al. | 600/300 |
| 2011/0172522 A1 | 7/2011 | Shuki | |
| 2012/0128227 A1 | 5/2012 | Minoshima et al. | |
| 2012/0237103 A1 | 9/2012 | Hu | |
| 2012/0243368 A1 | 9/2012 | Geiser et al. | |
| 2012/0321152 A1* | 12/2012 | Carroll | 382/128 |
| 2012/0321160 A1* | 12/2012 | Carroll | 382/131 |
| 2012/0323108 A1* | 12/2012 | Carroll | 600/407 |
| 2013/0215712 A1 | 8/2013 | Geiser et al. | |
| 2013/0289395 A1 | 10/2013 | Thiele | |
| 2014/0002075 A1* | 1/2014 | Lin et al. | 324/308 |

OTHER PUBLICATIONS

Chen H et al., entitled "Neural Plasticity After Acquired Brain Injury: Evidence from Functional Neuroimaging," PM R, 2010;2:S306-S312.

Garcia-Panach J et al., entitled "A voxel-based analysis of FDG-PET in traumatic brain injury: regional metabolism and relationship between the thalamus and cortical areas," J Neurotrauma, Sep. 2011;28(9):1707-17, Abstract Only.

Hattori N et al., entitled "Acute Changes in Regional Cerebral 18F-FDG Kinetics in Patients with Traumatic Brain Injury," J Nucl Med 2004; 45:775-783.

Kato T et al., entitled "Statistical Image Analysis of Cerebral Glucose Metabolism in Patients with Cognitive Impairment following Diffuse Traumatic Brain Injury," Journal of Neurotrauma, vol. 24, No. 6, 2007, 919-926.

Kelly J C, et al., entitled "Mild Traumatic Brain Injury: Lessons Learned from Clinical, Sports, and Combat Concussions," Rehabilitation Research and Practice, vol. 2012, 1-5.

Kim I J et al., entitled "Age-and sex-associated changes in cerebral glucose metabolism in normal healthy subjects: statistical parametric mapping analysis of F-18, flurodeoxyglucose brain positron emission tomography," Acta Radiol, Dec. 2009;50(10): 1169-74, Abstract Only.

Mummery C J et al., entitled "A Voxel-Based Morphometry Study of Semantic Dementia: Relationship between Temporal Lobe Atrophy and Semantic Memory," Ann Neurol 2000;47:36-45.

Nakayama N et al., entitled "Relationship between regional cerebral metabolism and consciousness disturbance in traumatic diffuse brain injury without large focal lesions: an FDG-PET study with statistical parametric mapping analysis," J Neurol Neurosurg Psychiatry 2006; 77:856-862.

Zhang J et al., entitled "Statistical parametric mapping and cluster counting analysis of [18F] FDG-PET imaging in traumatic brain injury," J Neurotrauma, Jan. 2010;27(1):35-49, Abstract Only.

PCT International Search Report dated Sep. 4, 2012 in connection with PCT International Patent Application No. PCT/US2012/42028, 4 pages.

PCT Written Opinion of the International Searching Authority dated Sep. 4, 2012 in connection with PCT International Patent Application No. PCT/US2012/42028, 7 pages.

The Office Action dated Feb. 14, 2014 for related U.S. Appl. No. 13/494,262.

Huisman et al. "Diffusion Tensor Imaging as Potential Biomarker of White Matter Injury in Diffuse Axonal Injury." AJNR Am J Neuroradiol, 25:370-376, Mar. 2004.

Office Action dated Jun. 5, 2014 from the U.S. Patent Office in connection with U.S. Appl. No. 13/494,262.

Office Action dated Jul. 11, 2014 from the U.S. Patent Office in connection with U.S. Appl. No. 13/494,262.

Office Action dated May 22, 2014 from the U.S. Patent Office in connection with U.S. Appl. No. 13/494,429.

Office Action dated Oct. 6, 2014 in connection with U.S. Appl. No. 13/494,262.

Office Action dated Nov. 4, 2014 in connection with U.S. Appl. No. 13/494,429.

Pujara, J, entitled "Understanding Feature Selection in Functional Magnetic Resonance Imaging," School of Computer Science, Computer Science Department, Carnegie Mellon University, Pittsburgh PA, Master of Science thesis, May 2005.

* cited by examiner

METHODS AND APPARATUS FOR ASSESSING ACTIVITY OF AN ORGAN AND USES THEREOF

CROSS-REFERENCE TO RELATED APPLICATIONS

This application is a continuation of U.S. application Ser. No. 13/494,429, filed Jun. 12, 2012, which is a continuation of U.S. application Ser. No. 13/494,262, filed Jun. 12, 2012, which claims the benefit of U.S. Provisional Application No. 61/498,243, filed Jun. 17, 2011, the contents of which are incorporated herein by reference in their entirety.

FIELD

This invention relates to methods and apparatus for imaging activity of an organ of a subject for diagnosis and prognosis of pathology or injury to the organ, where unaffected portions of the organ are used as a reference for assessing activity of afflicted areas of the organ.

BACKGROUND

Throughout this application various publications are referred to in parenthesis. Full citations for these references may be found at the end of the specification immediately preceding the claims. The disclosures of these publications are hereby incorporated by reference in their entireties into the subject application to more fully describe the art to which the subject application pertains.

Nuclear medicine involves the noninvasive quantification of physiological processes. In the case of positron emission tomography (PET), fluorine-18 deoxyglucose (FDG) has proven to be a remarkably good way of tracing the level of physiological glucose metabolism in living cells. Uptake of fluorine-18 deoxyglucose is proportional to the number of glucose transporter 1 (GLUT1) receptors expressed on the cell surface. The number of GLUT1 receptors on the surface is regulated by the cell in accord with its level of internally sensed demand for glucose. Once FDG glucose enters the cell, further metabolism is prevented by the lack of oxygen within the constructor. Thus, one has an ideal physiological tracer for glucose uptake, separated from further intracellular stages of glucose metabolism. New and improved PET scanners continue to be developed (e.g., Shiga et al., 2009).

Imaging studies have been used between groups of subjects to demonstrate evidence of injuries or pathologies (e.g., Kato et al., 2007; Zhang et al., 2010). Three dimensional images can be represented using voxels. A voxel is a data point on a regular grid in three dimensional space. A voxel, i.e., a volumetric pixel, is analogous to a pixel, which represents two dimensional image data. The data point can consist of a single piece of datum or multiple pieces of data. Voxel-based morphometry is an imaging analysis technique that can be used to investigate focal differences in, for example, the brain between two groups of subjects (e.g., Ashburner and Friston, 2000). Voxel-based morphometry studies have been carried out by comparing patients with controls, for example in studies of dementia (Mummery et al., 2000) and traumatic brain injury (Garcia-Panach et al., 2011).

The need for control groups can impede the use of imaging for diagnosis. This is especially the case since there are, for example, gender-specific cerebral areas of age-associated changes of FDG uptake (Kim et al., 2009). For example, accurate diagnosis of diffuse axonal injury is severely limited by requirements for adequate age- and gender-matched control groups. One widely used software program has only 4 patients below age 55; and only 37 patients in the 56-75 year age range as baseline controls. Other databases are even more lacking. Thus, it is impossible to objectively measure brain injury in those groups of individuals most prone to brain injury, i.e., infants, children, adolescents, athletes of age 15 to 30 and motor vehicle accident survivors aged 15 to 55. Data in those younger than 15 are very scarce.

The prevent invention address the need for a method of imaging injuries and pathologies that does not require comparison of a patient to a control group of subjects.

SUMMARY

In exemplary embodiments, the present invention makes use of the normal portions of a patient's own organ to calculate baseline physiological function. Using the patient as its own control creates far more powerful imaging and measurement statistics as well as greater reliability for the relevance of the measurements for the patient's own situation. With use of the individual as its own control, the available precision of measurement is vastly improved because one is not required to have a reference population of the same age or gender, or same manufacture or same generation of equipment, or precisely the same protocol of imaging in a reference population. Thus, the present invention can provide improved technical features over the art.

In exemplary embodiments, the invention provides methods for assessing the activity of an organ in a subject with the aid of a digital computer comprising: a) accessing by one or more computers a quantitative three-dimensional image of the organ that is represented as voxels, wherein each voxel contains information about the activity of a portion of the organ; b) calculating by the one or more computers a mean of the activity represented by the voxels, wherein voxels representing values at upper and lower extremes are excluded from calculation of the mean; c) calculating by the one or more computers a standard deviation of the mean obtained in step b), wherein voxels representing activity above a certain standard deviation of the mean indicate areas of the organ having increased activity and wherein voxels representing activity below a certain standard deviation of the mean indicate areas of the organ having reduced activity; and d) outputting by the one or more computers to an output device a representation of the organ showing areas of the organ having increased activity and/or reduced activity. In some exemplary embodiments, the method may further comprise outputting by the one or more computers to the output device a representation of the organ showing areas of the organ having neither increased activity and/or reduced activity.

In exemplary embodiments, the invention also provides systems for assessing the activity of an organ in a subject comprising one or more processors, a memory unit, and a computer-readable storage medium including computer-readable code that is read by the one or more processors to perform a method comprising the steps of: a) accessing by one or more computers a quantitative three-dimensional image of the organ that is represented as voxels, wherein each voxel contains information about the activity of a portion of the organ; b) calculating by the one or more computers a mean of the activity represented by the voxels, wherein voxels representing values at upper and lower extremes are excluded from calculation of the mean; c) calculating by the one or more computers a standard deviation of the mean obtained in step b), wherein voxels representing activity above a certain standard deviation of the mean indicate areas of the organ having increased activity and wherein voxels representing activity below a certain standard deviation of the mean indicate areas of the organ having reduced activity; and d) outputting by the one or more computers to an output device a representation of the organ showing areas of the organ having increased activity and/or reduced activity.

In exemplary embodiments, the invention further provides systems for assessing the activity of an organ in a subject comprising: a) an imaging system comprising: i) an imaging device for generating a quantitative three-dimensional image of the organ that is represented as voxels, wherein each voxel contains information about the activity of a portion of the organ; and ii) a computing device operatively connected to the imaging device and to a first display device; and b) one or more computers operatively connected to the imaging system, comprising one or more processors, a memory unit, and a computer-readable storage medium including computer-readable code that is read by the one or more processors to perform a method comprising the steps of: i) receiving by the one or more computers the generated three-dimensional organ image; ii) calculating by the one or more computers a mean of the activity represented by the voxels, wherein voxels representing values at upper and lower extremes are excluded from calculation of the mean; iii) calculating by the one or more computers a standard deviation of the mean obtained in step ii), wherein voxels representing activity above a certain standard deviation of the mean indicate areas of the organ having increased activity and wherein voxels representing activity below a certain standard deviation of the mean indicate areas of the organ having reduced activity; and iv) generating by the one or more computers a representation of the organ showing areas of the organ having increased activity and/or reduced activity.

In exemplary embodiments, the invention still further provides systems for assessing the activity of an organ in a subject comprising: a) one or more computing devices comprising one or more processors, a memory unit, and a computer-readable storage medium including computer-readable code that is read by the one or more processors to perform a method comprising the steps of: i) obtaining by the one or more computing devices a quantitative three-dimensional image of the organ that is represented as voxels, wherein each voxel contains information about the activity of a portion of the organ generated by an imaging device; ii) transmitting the generated three-dimensional organ image to one or more analysis computing devices; iii) obtaining a representation of the organ from the one or more analysis computing devices, wherein the representation shows areas of the organ having increased activity and/or reduced activity; and iv) displaying the obtained representation on the display device.

BRIEF DESCRIPTION OF THE DRAWINGS

The features and advantages of the disclosure can be more fully understood with reference to the following description of the disclosure when taken in conjunction with the accompanying figures, wherein.

DETAILED DESCRIPTION

Figure 1:
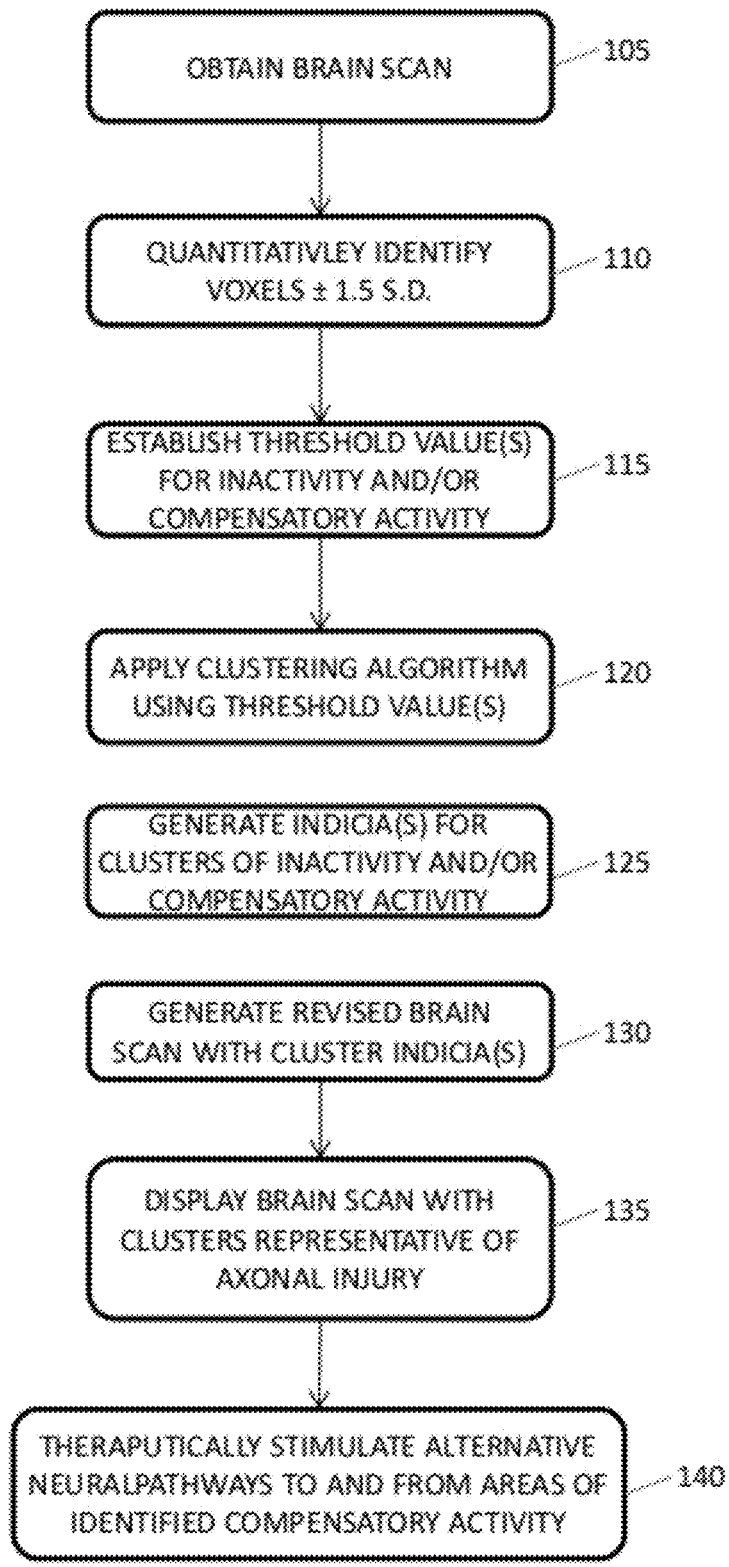
FIG. 1 is a flow chart illustrating an exemplary method for identifying voxels having inactivity and/or compensatory activity in comparison to a baseline of the normal portions of the entire brain according to an exemplary embodiment of the present disclosure.

In exemplary embodiments, the invention may provide a method for assessing the activity of an organ in a subject with the aid of a digital computer comprising:

a) accessing by one or more computers a quantitative three-dimensional image of the organ that is represented as voxels, wherein each voxel contains information about the activity of a portion of the organ;

b) calculating by the one or more computers a mean of the activity represented by the voxels, wherein voxels representing values at upper and lower extremes are excluded from calculation of the mean;

c) calculating by the one or more computers a standard deviation of the mean obtained in step b), wherein voxels representing activity above a certain standard deviation of the mean indicate areas of the organ having increased activity and wherein voxels representing activity below a certain standard deviation of the mean indicate areas of the organ having reduced activity; and d) outputting by the one or more computers to an output device a representation of the organ showing areas of the organ having increased activity and/or reduced activity.

In exemplary embodiments, the method may comprise outputting by the one or more computers to the output device a representation of the organ showing areas of the organ having neither increased activity and/or reduced activity.

In exemplary embodiments, the invention may provide a system for assessing the activity of an organ in a subject comprising one or more processors, a memory unit, and a computer-readable storage medium including computer-readable code that is read by the one or more processors to perform a method comprising the steps of:

a) accessing by one or more computers a quantitative three-dimensional image of the organ that is represented as voxels, wherein each voxel contains information about the activity of a portion of the organ;

b) calculating by the one or more computers a mean of the activity represented by the voxels, wherein voxels representing values at upper and lower extremes are excluded from calculation of the mean;

c) calculating by the one or more computers a standard deviation of the mean obtained in step b), wherein voxels representing activity above a certain standard deviation of the mean indicate areas of the organ having increased activity and wherein voxels representing activity below a certain standard deviation of the mean indicate areas of the organ having reduced activity; and d) outputting by the one or more computers to an output device a representation of the organ showing areas of the organ having increased activity and/or reduced activity.

In exemplary embodiments, the system may comprise outputting by the one or more computers to the output device a representation of the organ showing areas of the organ having neither increased activity and/or reduced activity.

Various values can be selected for use in excluding voxels representing values at upper and lower extremes from the calculation of the mean. As non-limiting examples, voxels can be excluded from calculation of the mean if the voxels represent values at the upper and lower 1%, 5% or 10% of the values.

In exemplary embodiments, other methods of excluding vowels that represent outlier values may be used. As one example, a first mean can be calculated of the activity represented by all the voxels. Then, voxels representing values at the upper and lower values can be excluded, either if the values are above or below a certain percentage of all values or if the values are above or below a certain standard deviation of the first mean. The voxels that are not excluded are then used to calculate a new mean of normal voxels.

Another method of excluding vowels that represent outlier values is to construct a histogram of values represented by all voxels, then fitting a curve to the histogram, and excluding voxels that deviate above or below the curve. These procedures can be performed by the one or more computers that calculated a mean of the activity represented by the voxels where voxels representing values at upper and lower extremes are excluded from calculation of the mean.

Standard deviation (SD) of the mean can be expressed, for example in 1 SD, 0.1 SD or 0.01 SD units. For example, SD can be calculated in 0.01 or 0.1 SD units between 3.0, 3.5, 4.0 or 4.5 SD units below the mean to 3.0, 3.5, 4.0 or 4.5 SD units above the mean. As a further example, in one embodiment, standard deviation (SD) is calculated in 0.1 SD units between 4.0 SD units below the mean to 4.0 SD units above the mean.

In exemplary embodiments, different thresholds can be established for classifying voxels as representing increased activity or decreased activity. For example, a threshold can be set at 1.0 SD, 1.5 SD, 1.65 SD, 2.0 SD, 2.5 SD, 3.0, 3.5, 4.0 or 4.5 SD units above or below the mean. As a further example, in one embodiment, voxels representing activity above 1.5 SD units above the mean indicate areas of the organ having increased activity and voxels representing activity below 1.5 SD units below the mean indicate areas of the organ having reduced activity. Other variations can be used consistent with the letter and spirit of the present disclosure.

The organ from which the image is obtained can be, for example, brain, heart, lung, kidney, liver, pancreas, bladder, salivary glands, esophagus, stomach, gallbladder, intestines, colon, rectum, thyroid, parathyroid, adrenal gland, ureter, bladder, urethra, tonsils, adenoids, thymus, spleen, ovary, fallopian tube, uterus, vagina, mammary gland, testes, vas deferens, seminal vesicle, prostate, penis, pharynx, larynx, trachea, bronchi or lung, to name a few.

In exemplary embodiments, voxels from the one side of an organ can be compared with corresponding voxels from an opposite side of the same organ. For organs that occur on both sides of the body, such as for example, brain, lung or kidney, in exemplary embodiments, voxels from an organ on one side of the body can be compared with corresponding voxels from the corresponding organ on the opposite side of the body.

In exemplary embodiments, the image of the organ can be obtained using, for example, positron emission tomography (PET), functional magnetic resonance imaging (fMRI), any type or sequence of magnetic resonance imaging (MRI) including diffusion tensor magnetic resonance imaging, single photon emission computed tomography (SPECT), magnetic source imaging or optical imaging, to name a few. For example, three dimensional imaging of the organ can be obtained using positron emission tomography (PET) in connection with a computed tomography (CT) X-ray scan, or may be obtained using positron emission tomography (PET) in connection with any magnetic resonance scan.

Dedicated brain-only solid-state PET scanners are being developed by Hitachi. Such units may provide essential physiological information for a much lower patient radiation dose than existing PET CT machines. A PET CT general-purpose machine may generate a CT dose 10 times the radiation dose from a 15 milicurie FDG injection. The dedicated machine entirely does away with the CT dose and drops the required FDG dose by factor of five to about 3 mCi. In exemplary embodiments, such dedicated machines and the like can be used.

In exemplary embodiments, areas of increased or reduced activity in an organ can indicate a disease, an injury, a response to an injury, or functional changes in areas that have been disconnected from the remainder of the brain or spinal cord because of injury to connective structures. Non-limiting examples of such diseases or injuries include a tumor, stroke, infection, demyelinating disease, degenerative disease, dementia, ischemia, traumatic injury, shock wave injury, or primary or metastatic cancer, to name a few. For example, if the organ is the brain, areas of reduced activity can represent diffuse axonal injury, and/or represent areas of the brain disconnected from their source of workload. Functional connectivity MRI can be used to show which parts of the brain are communicating.

In exemplary embodiments, areas of disease or injury can be further analyzed by determining a ratio of a number of voxels showing increased activity to a number of voxels showing decreased activity within the area of disease or injury. Further analysis can include determining a ratio of a number of voxels showing increased activity to a number of voxels showing decreased activity within the entirety of a diseased area and/or at a border region between an area of disease or injury and normal tissue.

In exemplary embodiments, an image of the organ can be obtained and analyzed at a plurality of time points. Images obtained at different time points can be used, for example, to evaluate effectiveness of a course of treatment of a subject or to evaluate progression of disease.

For example, an image of the brain can be obtained and analyzed at a plurality of time points during neurological surgery or during neurological intensive care. Frequent serial brain PET studies can be used to guide neurological surgery and neurological intensive care of brain injured patients. In exemplary embodiments, periodic, or non-periodic repeated assessments may provide a tool for demonstrating response to therapy in a timely manner. By way of non-limiting example, studies may be repeated, e.g., a minimal interval of about three hours to a more common interval of daily, weekly, monthly, to name a few, to document brain glucose metabolism, brain oxygen metabolism, brain blood flow, and other vital parameters, to name a few. Some neurological surgery procedures have operating room durations in excess of 10 hours. Neurological intensive care can last for months.

As another example, an image of the heart can be obtained and analyzed at a plurality of time points during cardiac surgery, during cardiac interventional procedures, and/or during cardiac intensive care. In exemplary embodiments, frequent serial heart PET studies can be used to guide cardiac surgery and cardiac interventional intensive care of heart injured patients. Periodic and/or non-periodic repeated assessments may provide a tool for demonstrating response to therapy in a timely manner. Studies may be repeated, e.g., a minimal interval of about 5 minutes to a more common interval of daily, weekly, monthly, to name a few, to document cardiac nutritional blood flow using rubidium 82, cardiac FDG metabolism using fluorine 18; cardiac oxygen metabolism using oxygen 15, and other vital parameters, to name a few.

Voxels within an area of disease or injury in the organ can be analyzed at a plurality of time points, and a ratio of a number of voxels within the area showing increased activity over time to a number of voxels within the area showing decreased activity over time can be used as a measure of whether the disease or injury is improving or not improving. For example, if the disease is cancer, a decrease in the ratio of the number of voxels within the area of disease showing increased activity over time to the number of voxels within the area of disease showing decreased activity over time is indicative of a favorable outcome. As another example, if the disease is reduced blood flow to the area, an increase in the ratio of the number of voxels within the area showing increased activity over time to the number of voxels within the area showing decreased activity over time is indicative of a favorable outcome.

In exemplary embodiments, the subject can be any living organism, including any type of animals, such as humans.

The methods disclosed herein can comprise imaging the subject to obtain an image of the organ.

In exemplary embodiments, a system for assessing the activity of an organ in a subject may comprise:

a) an imaging system comprising:

i) an imaging device for generating a quantitative three-dimensional image of the organ that is represented as voxels, wherein each voxel contains information about the activity of a portion of the organ; and ii) a computing device operatively connected to the imaging device and to a first display device; and b) one or more computers operatively connected to the imaging system, comprising one or more processors, a memory unit, and a computer-readable storage medium including computer-readable code that is read by the one or more processors to perform a method comprising the steps of:

i) receiving by the one or more computers the generated three-dimensional organ image;

ii) calculating by the one or more computers a mean of the activity represented by the voxels, wherein voxels representing values at upper and lower extremes are excluded from calculation of the mean;

iii) calculating by the one or more computers a standard deviation of the mean obtained in step ii), wherein voxels representing activity above a certain standard deviation of the mean indicate areas of the organ having increased activity and wherein voxels representing activity below a certain standard deviation of the mean indicate areas of the organ having reduced activity; and iv) generating by the one or more computers a representation of the organ showing areas of the organ having increased activity and/or reduced activity.

In exemplary embodiments, the method performed by the one or more processors can comprise displaying by the one or more computers the generated representation of the organ on a second display device operatively connected to the one or more computers. The method performed by the one or more processors can also comprise transmitting from the one or more computers the generated representation of the organ to the imaging system so as to be displayed on the first display device.

In exemplary embodiments, the image of the organ can obtained using, e.g., positron emission tomography (PET), functional magnetic resonance imaging (fMRI), any type or sequence of magnetic resonance imaging including diffusion tensor imaging (MRI); magnetic source imaging, optical imaging, computed tomography (CT) X-ray scan, or combinations thereof, to name a few. In some exemplary embodiments, the image of the organ may be obtained using positron emission tomography (PET), alone, or in combination with CT or MRI.

In exemplary embodiments, a system for assessing the activity of an organ in a subject comprising one or more computing devices may comprise one or more processors, a memory unit, and a computer-readable storage medium including computer-readable code that is read by the one or more processors to perform a method comprising the steps of:

i) obtaining by the one or more computing devices a quantitative three-dimensional image of the organ that is represented as voxels, wherein each voxel contains information about the activity of a portion of the organ generated by an imaging device;

ii) transmitting the generated three-dimensional organ image to one or more analysis computing devices;

iii) obtaining a representation of the organ from the one or more analysis computing devices, wherein the representation shows areas of the organ having increased activity and/or reduced activity; and iv) displaying the obtained representation on the display device.

In exemplary embodiments, the representation of the organ can be generated using the transmitted three-dimensional organ image at the one or more analysis computers by a method comprising, e.g., the steps of:

i) calculating a mean of the activity represented by the voxels of the three-dimensional organ image, wherein voxels representing values at upper and lower extremes are excluded from calculation of the mean; and ii) calculating a standard deviation of the mean obtained in step i), wherein voxels representing activity above a certain standard deviation of the mean indicate areas of the organ having increased activity and wherein voxels representing activity below a certain standard deviation of the mean indicate areas of the organ having reduced activity.

In exemplary embodiments, a voxel analysis of the patient's own organ can be used to establish mean voxel values. Median and mode voxel values can also be determined. The fundamental principles of voxel-based morphometric (VBM) methods are well known.

In exemplary embodiments, a histogram may be provided, ranging from −4 standard deviations to +4 standard deviations, for example, in 0.1 standard deviation steps illustrating the distribution of voxels within the boundaries of the organ being examined. This histogram display of voxels can be used to select those voxels which will be statistically analyzed and graphically displayed. In a normal organ one expects a Gaussian distribution of voxels.

In exemplary embodiments, voxels can be analyzed using, for example, commercially available software such as provided by MIM Software Inc. (Cleveland, Ohio).

In exemplary embodiments, volumetric three-dimensional outlines of clusters can be viewed in a cinematic mode, for example, proceeding from −4 standard deviations toward −1 standard deviation thereby showing areas of each degree of damage. Similarly a cinematic review of +3 standard deviation volumetric three-dimensional outlines allows demonstration of compensatory increase in neuronal function of undamaged structures and other recruited pathways. Such analysis can further verify the reality of damaged tissue by demonstrating the reality of compensatory mechanisms.

Where clusters of inactivity or compensatory activity are found, in exemplary embodiments, different indicia such as color overlays, text labels, boundary outlines or the like may be applied to the visual display output. The display output can be a computer monitor but may also be high resolution printers as well, or other display devices. Three-dimensional volumetric displays of medical data are becoming increasingly available.

According to an exemplary embodiment, the invention may include the ability to generate a short, cycling presentation of the identified voxels (inactive and/or compensatory) at a plurality of standard deviations. This cycling presentation or animation may be presented in three-dimensional contours of the organ. Three-dimensional contours of details of degree of metabolism within areas of damage can be simultaneously displayed.

In exemplary embodiments, the number of voxels within the three-dimensional boundaries defined by standard deviations, such as, for example, 3, 2.5, 2.0, 1.5, and 1.0 standard deviations above or below the mean of non-involved tissue within that patients organ can be mapped over time to provide a very sensitive analysis of response to therapy versus progression of disease.

In an exemplary embodiment, the brain quantitative analysis program may automatically cycle from the lowest transaxial slice to the highest transaxial slice. In some exemplary embodiments, the thickness of the slice can be adjusted from 4 mm to 20 mm.

Exemplary embodiments of the present disclosure may be applicable to a large range of noninvasive imaging modalities that can be used to address and quantitate changes in tissue physiology repair and disease processes over time.

In exemplary embodiments, clusters of voxels may be defined by deviants from the mean and can clearly show both the epicenter, the umbra and the penumbra of any imaginable physiological deviance within any organ, and may be measured by any modality that is voxel-based. For example, imaging MRI, functional MRI, diffusion tensor MRI, and other experimental MRI sequences may be candidates for such analysis. In exemplary embodiments, such modalities may include positron emission tomography, magnetic resonance imaging, single photon emission computed tomography, CT, volumetric ultrasound, optical tissue imaging, and all other means of noninvasive volumetric imaging of living tissues.

In exemplary embodiments, symmetrical organs such as brain and kidneys, comparison can be made with the corresponding area in the contralateral side, bearing in mind that within the brain, the contralateral structure may be up-regulated to compensate for decreased function in the injured structure.

In exemplary embodiments, diffuse axonal injuries in the brain may generally appear as scattered small areas of decreased glucose metabolism on the gyri of the cerebral cortex. These lesions may be almost impossible to visually identify because of their location on a variable terrain. In some exemplary embodiments, voxel-based threshold imaging may clearly identify small scattered lesions.

In exemplary embodiments, objective quantification of the number, size, severity, and location of, for example, areas of decreased glucose metabolism within the brain may be possible without the need of a control group. Thus, possible artifacts generated by arbitrary brain deformation may be avoided. In some exemplary embodiments, serial quantification of number, size, severity and location of injured areas may provide objective documentation of quantitative response to therapy. For example, therapies such as drug intervention and rehabilitation intervention can be compared with the spontaneous natural history of the untreated pathological process.

Within the brain, amyloid protein is commonly deposited at areas of injury, potentially leading to progressively greater injury over time due to amyloid toxicity. In exemplary embodiments, amyloid brain imaging may be a natural adjunct to fluorine 18 deoxyglucose brain imaging in traumatic brain injury.

There may be multiple patterns of injury following trauma to the brain including coup-contrecoup contusion of brain surfaces, axonal damage by propagation of shear forces resulting in Wallerian degeneration and death of widely distributed neurons whose axons assembled into a tract within the path of shear forces.

In exemplary embodiments, baseline measurements may be made on individuals involved in contact sports who can be tracked season by season. In exemplary embodiments, the present invention can be used to identify the vulnerable post-concussion time during which repeated trauma can produce disproportionate severe damage.

Military personnel can be screened for susceptibility to additional blast injury predeployment, potentially decreasing the total number of individuals whose cumulative brain damage renders them nonfunctional. Most individuals have a degree of cognitive reserve which masks the behavioral and neurological signs and symptoms of lesser degrees of brain injury.

According to exemplary embodiments, in any area of diseased tissue, adjacent voxels may include volumes of cells with improving metabolism adjacent to volumes of cells with declining metabolism. In some exemplary embodiments, the ratio of voxels advancing to voxels declining may be a measure of whether the overall physiology is favoring regeneration or death. In some exemplary embodiments, whether the process is cancer where one wants the decline to be predominant or areas of blocked blood flow where one wants the advance to be predominant, progress of the local physiological condition can be objectively measured in a timely fashion to allow therapeutic intervention with near real-time monitoring of the results. This may allow one to measure the status of the region, intervene therapeutically, and then remeasure.

In exemplary embodiments, each patient, and each area of brain hypometabolism may require frequent monitoring to detect the local advance decline ratio. For example, each patient and each area of brain hypometabolism may have differing dose response curves for any therapeutic intervention.

In exemplary embodiments, the ratio of the number of voxels improving/number of voxels worsening in an anatomical area can provide a unique measure of overall disease progression and treatment effectiveness over time. In addition to the injured or diseased area itself, the border between normal and abnormal tissue areas may be another region of interest.

In exemplary embodiments, the number of voxels in each degree of deviance from the mean may be obtained, and serial images may be displayed, such as, for example, starting with those voxels that are most negative (−4 standard deviations). Further, the obtained voxels may be summed with all interval voxels to a selected endpoint, such as, for example, −1.65 standard deviations. This may produce a quantitative three-dimensional volumetric map of the range of disease. This map may be electronically saved on any suitable computer-readable storage device and subsequently used to quantitatively compare with a second volumetric map obtained after therapy in accordance with the expected time course of disease resolution. For example, the second map may be obtained one to three months after therapy relating to chronic conditions. In other situations, the second map may be obtained one to three days after therapy relating to acute conditions.

In exemplary embodiments, the quantitative disease assessment taking place at regular intervals may serve as an objective measurement of the efficacy of any drug or interventional therapy. For example, in a laboratory or a clinical research setting more frequent observations can document the physiology of the repair sequence. Thus surrogate markers for pharmacological intervention trials may be validated. These can be of immense help in drug discovery. These can also be of immense help in determining whether an individual patient is benefiting from the intervention. Non-responders can be spared potential toxicity that is not offset by benefit.

In some exemplary embodiments, a histogram display of all of the voxels within the defined boundaries of a disease process within a specific anatomical area may be provided. For example, an area of traumatic brain injury in the right frontal lobe may contain 500,000 voxels. 100,000 of these voxels may be located within plus and minus 1 millimeter of the transition zone from affected tissue to normal tissue, the apparent visual boundary of the disease process. The 100,000 voxels in the transition zone will be expected to display a wide range of metabolic uptake values. The voxels which are more centrally located will also be expected to exhibit a wide range of metabolic uptake values. All of the voxels within the visual boundary of the disease process are likely to change metabolic uptake over time as the cells improve or die.

In an exemplary embodiment, a software product may be used for detecting diffuse axonal injuries in a brain. The software product may be any suitable computer-readable storage media that contains instructions, that when executed, cause one or more computers to perform the steps: accessing a digital brain scan of a subject's entire brain; quantitatively identifying voxels having inactivity of, e.g., −1.65 standard deviations or less from that of the entire brain, or activity of, e.g. +1.65 standard deviations or more; establishing a threshold value for localizing one or more clusters of said identified voxels; applying a clustering algorithm to localize said one or more clusters; generating a revised digital brain scan image with visually perceptible indicia associated with said one or more clusters localized; and displaying said revised digital brain scan image on an output device.

FIG. 1 shows, according to an exemplary embodiment, a method for detecting diffuse axonal injuries. At step 105, a volumetric digital brain scan image of a subject's entire brain may be obtained or accessed. At step 110, voxels may be quantitatively identified which are, e.g., −1.5 standard deviations or less from that of the entire brain which may indicate inactivity and/or are, e.g., +1.5 standard deviations or more from the entire brain which may indicate compensatory activity. At step 115, one or more threshold values may be established for localizing one or more clusters of said identified voxels. At step 120, a clustering algorithm may be applied to localize said one or more clusters using the one or more threshold values. For example, the clustering algorithm may be applied to the identified voxels above or below the 1.5 standard deviations from the brain. At step 125, one or more indicias may be generated with respect to the one or more sets of identified clusters. Using the generated indicias, at step 130, a revised digital brain scan image with visually perceptible indicia associated may be generated. At step 135, a revised digital brain scan image may be displayed on an output device. At step 140, based on the generated image, alternative pathways to and from the areas of identified areas of compensatory activity may be stimulated.

In some exemplary embodiments, the method as illustrated in FIG. 1 may further comprise the steps of: accessing a digital brain scan image of a subject's entire brain; quantitatively identifying voxels having inactivity of at a plurality of standard deviations less than, e.g., −1.0; establishing a threshold value for localizing one or more clusters of said identified voxels; applying a clustering algorithm to localize said one or more clusters; sequentially generating a plurality of revised digital brain scan images with visually perceptible indicia associated with said one or more clusters localized at each standard deviation value; and displaying said revised digital brain scan image on an output device.

According to an exemplary embodiment, diffuse axonal injuries may be detected in a brain by implementing a method comprising the steps of: accessing a digital brain scan image of a subject's entire brain; quantitatively identifying voxels having compensatory activity of at a plurality of standard deviations greater than, e.g., 1.0; establishing a threshold value for localizing one or more clusters of said identified voxels; applying a clustering algorithm to localize said one or more clusters; sequentially generating a plurality of revised digital brain scan images with visually perceptible indicia associated with said one or more clusters localized at each standard deviation value; and displaying said revised digital brain scan images on an output device. In some exemplary embodiments, the revised digital brain scan images may be presented in three-dimensional contours.

Figure 2:
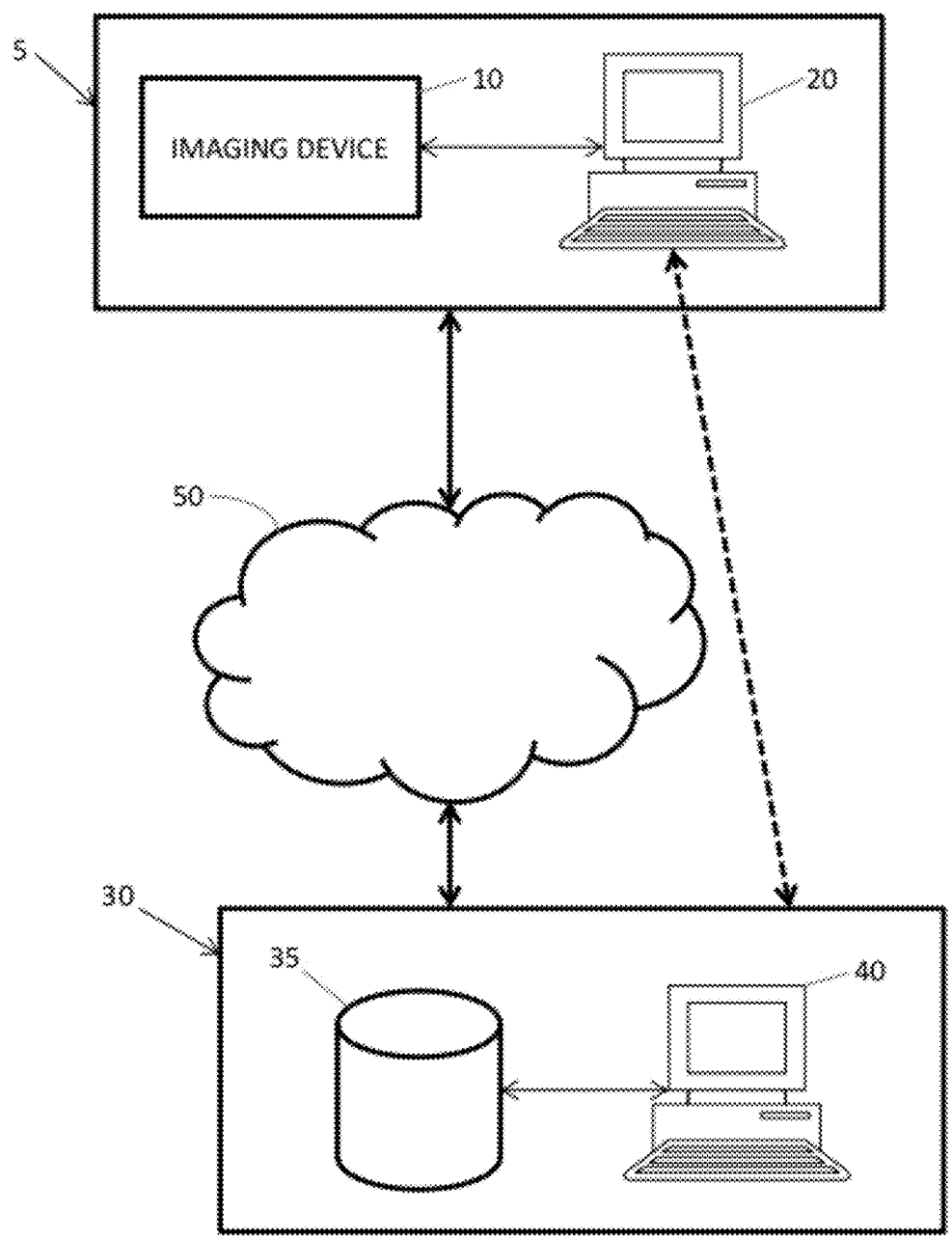
FIG. 2 is a schematic representation illustrating a imaging system operatively connected to one or more computing devices according to an exemplary embodiment of the present disclosure.
Figure 3:
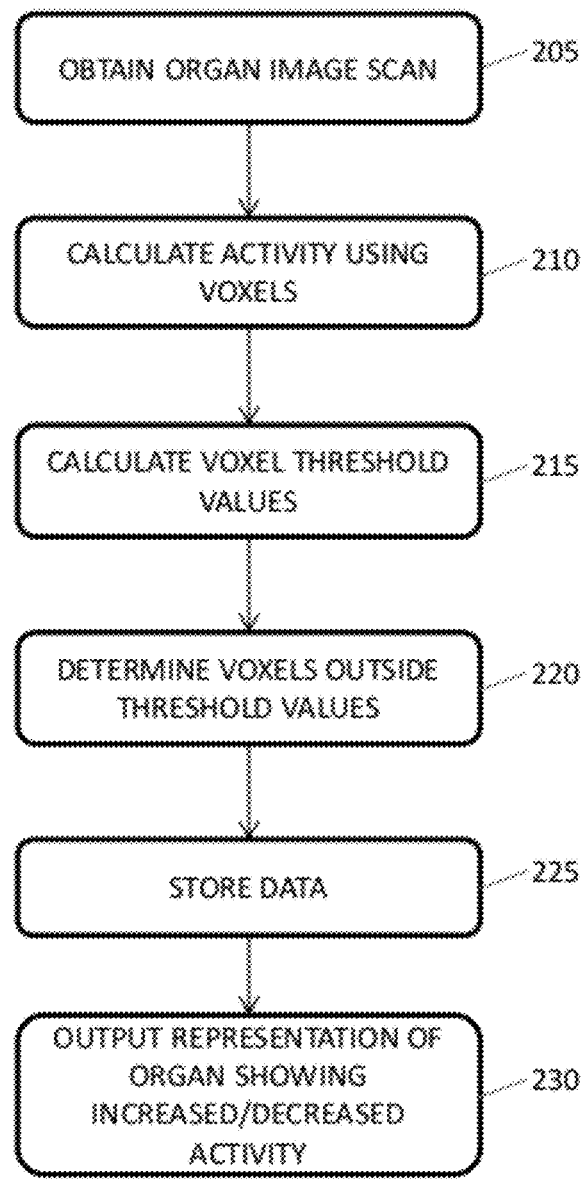
FIG. 3 is a flow chart illustrating an exemplary method for assessing the activity of an organ in a subject according to an exemplary embodiment of the present disclosure.

According to another exemplary embodiment, FIG. 2 shows an imaging system, generally designated by number 5. The imaging system 5 may include one or more imaging devices designated by number 10, that may be operatively connected to one or more computing devices generally designated by number 20. The imaging device 10 may generate an quantitative three-dimensional image of an organ, such as, for example, a brain, heart, lung, kidney, liver, pancreas, bladder, salivary glands, esophagus, stomach, gallbladder, intestines, colon, rectum, thyroid, parathyroid, adrenal gland, ureter, bladder, urethra, tonsils, adenoids, thymus, spleen, ovary, fallopian tube, uterus, vagina, mammary gland, testes, vas deferens, seminal vesicle, prostate, penis, pharynx, larynx, trachea, bronchi and lung, to name a few. In exemplary embodiments, the image of the organ may be generated using positron emission tomography (PET), computed tomography (CT) X-ray scan, functional magnetic resonance imaging (fMRI), magnetic source imaging or optical imaging, or combinations thereof. For example, the three-dimensional imaging maybe obtained using a PET scan in connection with a CT X-ray scan.

In exemplary embodiments, the imaging system 10, and by extension, any one of its components, may be operatively connected to one or more computer networks 50, such as, for example, the Internet, or any other suitable network, via, by way of example, a set of routers and/or networking switches. The imaging system 10 may be connected to an imaging analysis system 30 or any one of its components. For example, the imaging analysis system 30 may include one or more analysis computers, designated by number 40. The analysis computers 40 may include one or more processors, computer readable storage media, and memory units. The one or more processors may read and execute software embodied as instructions stored on the computer readable storage media, according to exemplary embodiments herein.

In exemplary embodiments, the analysis system 30 may be used to assess the activity of organ. Referring to FIG. 2, at step 205, the analysis computers 40 may obtain a image scan of an organ. The organ may be from an animal, including a human. The image scan data generated by the imaging device 10 may be sent directly or indirectly to the analysis system 30.

The obtained image scan may be a quantitative three-dimensional image of the organ. This image or image scan may include voxels or voxel data, wherein each voxel contains information about the activity of a portion of the imaged organ. In one exemplary embodiment, the imaging device 10 may generate a PET scan of the organ in a Digital Imaging and Communications in Medicine (DICOM) format. In this regard, the image or scan data may contain at least four elements as follows: an x coordinate, a y coordinate, a z coordinate, and a value measured at the x, y, and z coordinates. Since DICOM is a standard covering both data formats and protocols for communications, the image scan/data may be obtained several ways. See DICOM at: http://en.wikipedia.org/wiki/DICOM.

At step 210, the obtained image scan may be used by the analysis computers 40 to calculate activity using the voxels. For example, the mean of the activity represented by the voxels may be calculated. In some exemplary embodiments, voxels representing extreme upper and lower values may be excluded. Voxels representing values at the upper and/or lower 1%, 5%, 10%, or any other appropriate voxels representing values in an extreme range may be excluded.

At step 215, the analysis computers 40 may further, based on the calculated mean, calculate one or more voxel threshold values. In an exemplary embodiment, the analysis computers 40 may calculate a standard deviation using the calculated mean. For example, the standard deviation may be calculated in 0.1 standard deviation (SD) units between 4.0 SD units below the mean to 4.0 SD units above the mean. In some exemplary embodiments, the standard deviation may be calculated in 0.01 standard deviation (SD) units. In some embodiments, the standard deviation may be calculated in units between 3.0 SD units below the mean to 3.0 SD units above the mean.

At step 220, the analysis computers may determine voxels are outside or beyond the calculated threshold values. The analysis computers 40 may determine voxels which are a specified standard deviation above or below the mean, as such voxels may respectively indicate areas of the organ with increased or decreased activity. For example, voxels representing activity 1.65 SD units above or below the mean may indicate, respectively, increased or decreased activity. In some exemplary embodiments, other standard deviation unit values may be used to indicate activity/inactivity. For example, voxels representing activity anywhere from 1.00-4.00 SD units above or below the mean may indicate increased or decreased activity.

At step, 225, the calculated data regarding the voxels may be stored, such as in databases 35, for future use. At step 230, a representation of the organ, based on the calculations performed by the analysis computers 40, may be outputted to an output device to show the areas of the organ with increased and/or decreased activity. For example, the analysis computers 40 may be connected to a display device to display the representation of the organ. In some exemplary embodiments, the displayed representation may be a histogram.

In some exemplary embodiments, software such as the MIMneuro may be used at least by the analysis computers 40 to perform one or more of the calculations and generate a representative output based on such calculations, such as for example a histogram.

In some exemplary embodiments, the representation of the output representation of the organ showing increased/decreased activity may be sent from the analysis computers 40 to the imaging system 10. For example, the output representation may be displayed a on a display operatively connected to the computer 20. The imaging device 10 and/or computer may be located any suitable locations, such as, for example, a doctor's office, a hospital, a clinic, to name a few.

The output representation and associated calculations related to the organ may be used by a physician. In an exemplary embodiment, a physician may observe a representation, such as histogram of the organ scan. For example, the physician may select a range of histogram bars representing voxel values that are a certain amount of standard deviations away from the mean for the entire organ scan, such as for example, 1.5 SD units, 1.65 units, to an name a few. In this regard, such a selection may be symmetrical about the mean. For instance, if a large count of voxels (i.e. a spike) occurs at −1.3 standard deviations, then something less than 1.3 standard deviations will be selected as the "normal range" both above the mean and below the mean, and equidistant from the mean. Further, the physician may perform a visual verification of the normal area. Further, the analysis computers 40 or computer 20 may be used to display a visual map of the scan data that highlights the "normal area" as a result the physician's selection. If the selection verifies, then the mean, median and mode may be calculated and stored for future comparisons.

In exemplary embodiments, areas of increased or reduced activity in the organ indicate a disease or an injury, such as, for example, a tumor, stroke, infection, demyelinating disease, degenerative disease, dementia, ischemia, traumatic injury, or primary or metastatic cancer, to name a few. For example, with respect to the brain, areas of reduced activity in the organ may represent diffuse axonal injury.

Further processing regarding the voxels may include rescaling the voxels and calculating an advance/decline ratio. The voxels may be rescaled so as to eliminate any biases, with any scaled data and/or scaling factors may be stored for future reference. The advanced/decline ratio may also be stored for future reference. In addition, depending on the type of organ imaged, the voxels from one side of the imaged organ may be compared with the corresponding voxels on the opposite side of the same organ. Similarly, voxels from one organ on side of the body may be compared with corresponding voxels on the corresponding organ on the opposite side of the body.

Analyses preformed using the voxels may include determining a ratio of a number of voxels showing increased activity to a number of voxels showing decreased activity at a border region between an area of disease or injury and normal tissue.

The process of accessing organ activity as illustrated in FIG. 2 may be repeated over a period of time at certain intervals so as to determine any changes in activity. In this regard, an image of the organ may obtained and analyzed at a plurality of time points. The images obtained at different time points may be used to evaluate effectiveness of a course of treatment of a subject or to evaluate progression of disease. The voxels within an area of disease or injury in the organ may be analyzed at a plurality of time points and a ratio of a number of voxels within the area showing increased activity over time to a number of voxels within the area showing decreased activity over time may be a measure of whether the disease or injury is improving or not improving.

In the case of a human brain being imaged/scanned, psychometric tests may be used in addition or in conjunction with to assess and/or evaluate the brain and its activity.

Figure 4A:
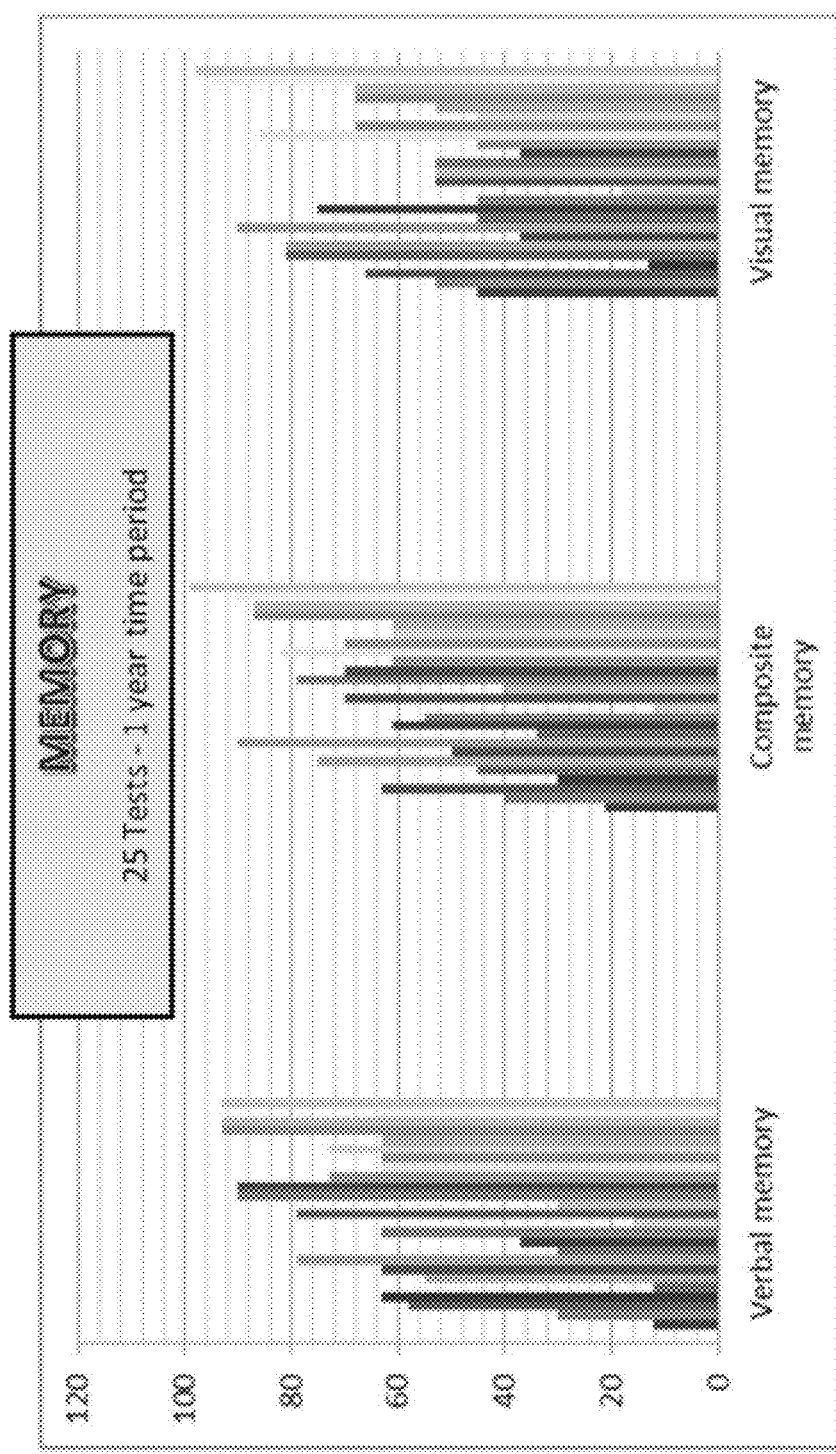
FIGS. 4A-4D are exemplary charts showing results of various psychometrics tests performed with a subject over a one year period.
Figure 4B:
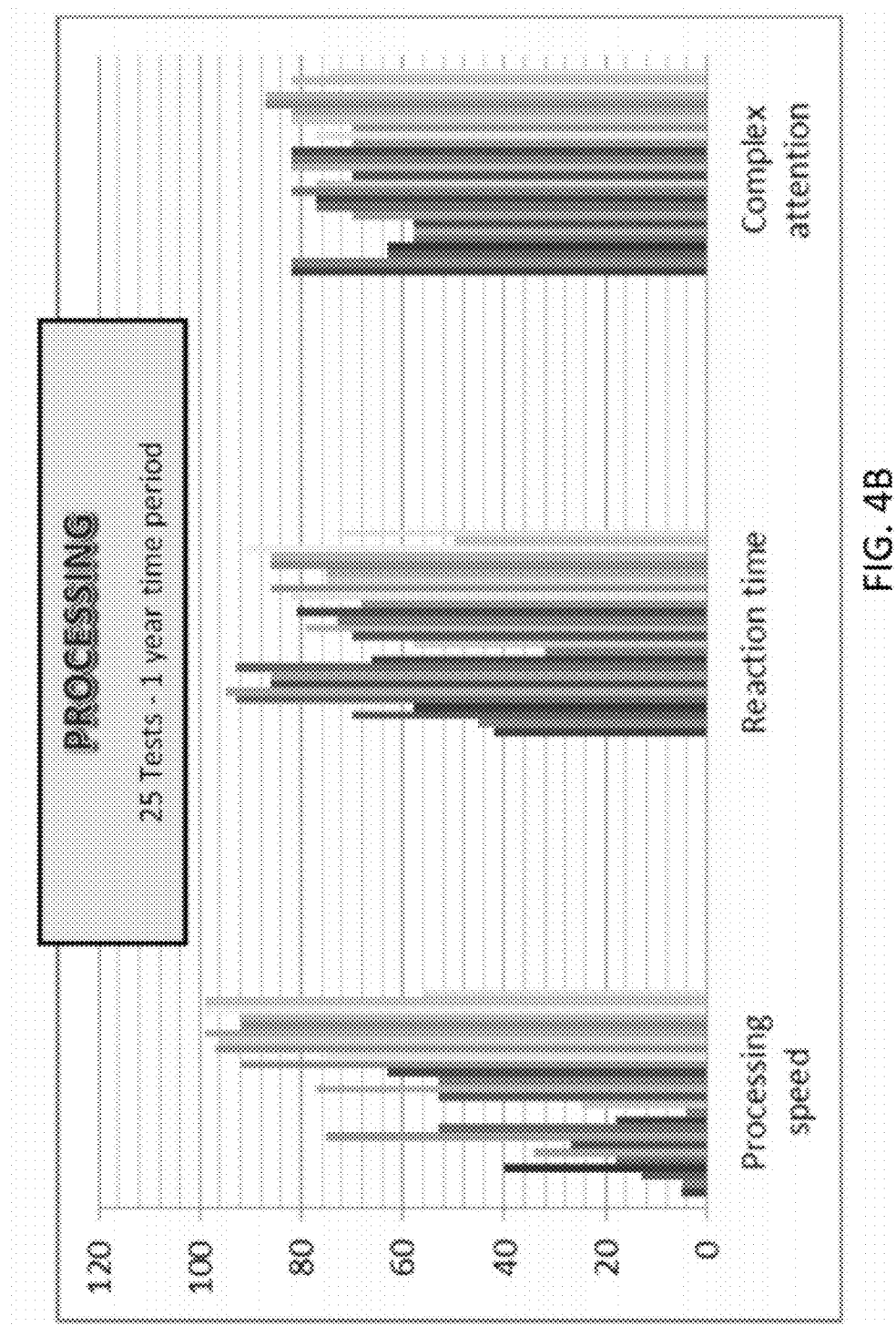
Figure 4C:
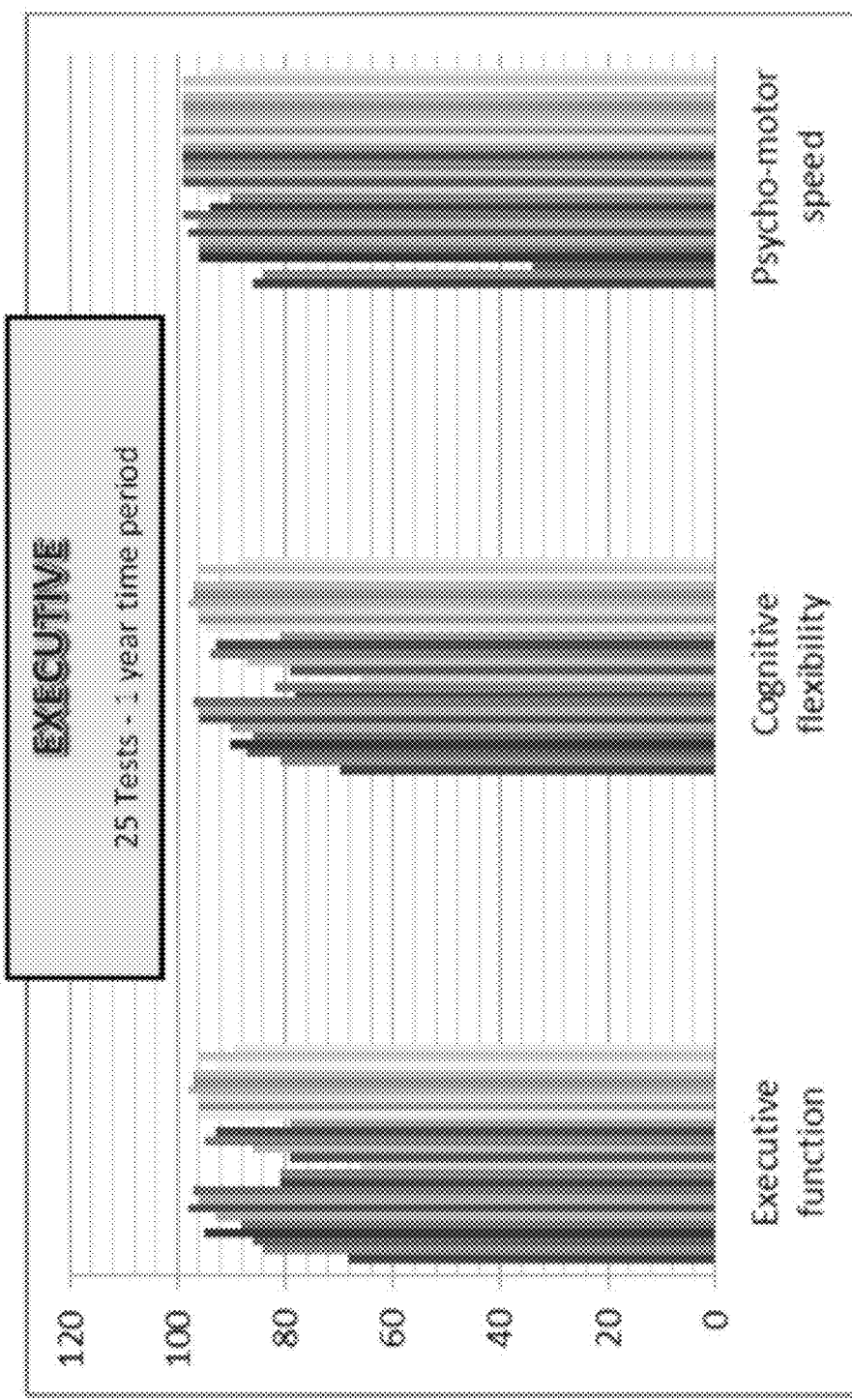
Figure 4D:
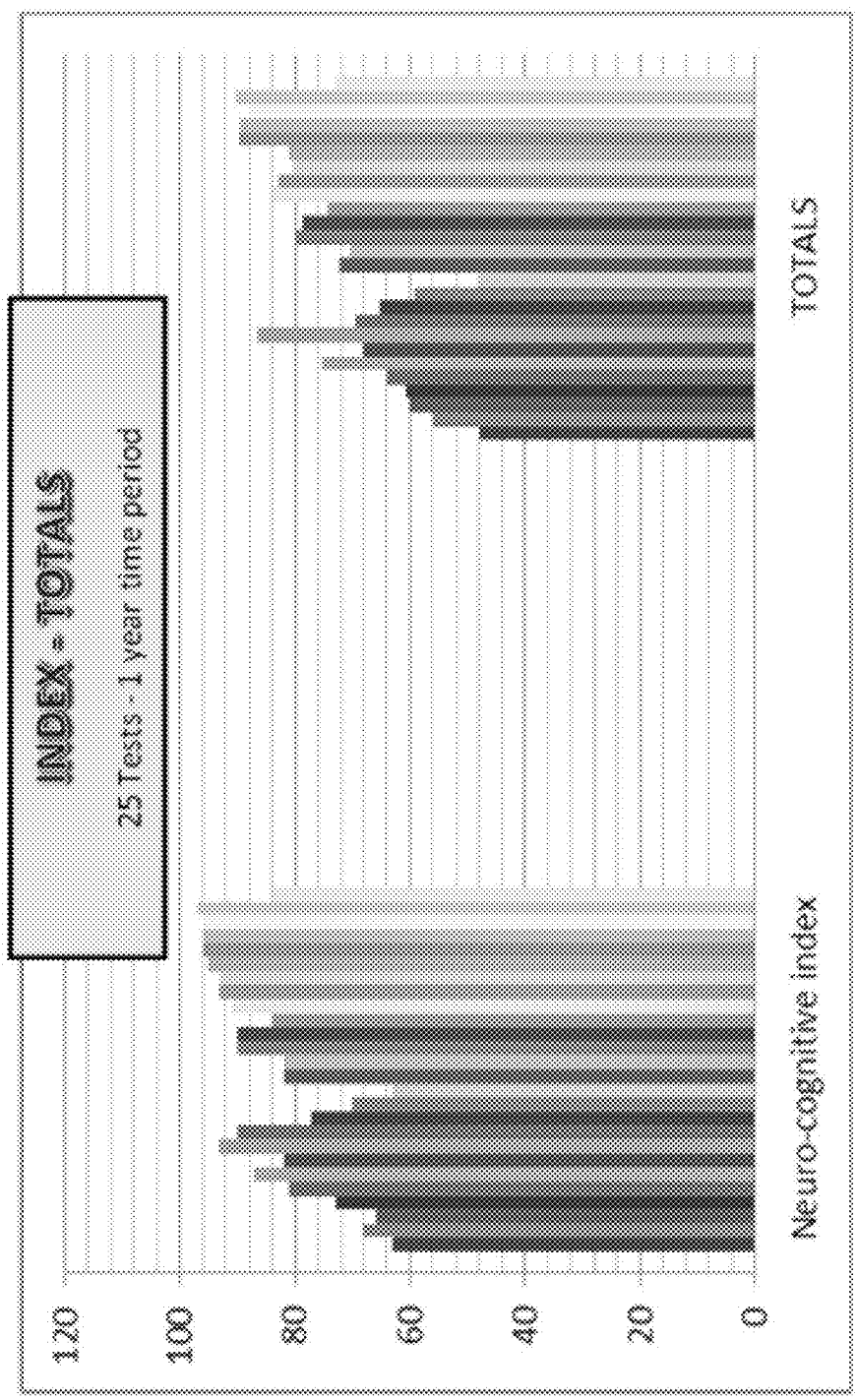

In situations where a brain is being analyzed or accessed, a plurality of psychometric tests may also be administered with respect to the patient over the same period of time. In any event, after the process is repeated various things may be tracked, such as for example, the absolute number of voxels, the advanced/decline ratio, and the percentage of activity change in certain areas, to name a few. FIGS. 4A-4B, shows results of various psychometric tests that may administered over a 1 year time period.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense. This invention will be better understood from the Experimental Details, which follow. However, one skilled in the art will readily appreciate that the specific methods and results discussed are merely illustrative of the invention as described more fully in the claims that follow thereafter.

EXPERIMENTAL DETAILS

Case Study #1
Quantitative Evaluation Post Hyperbaric Oxygen Therapy
History:

RM, a 46 year old male suffered traumatic brain injury when he fell on his head from a loft, a distance of 8 feet in February 1997. The patient was severely incapacitated, declared totally and permanently disabled by Social Security and was evaluated at Mayo Clinic Jacksonville. With remarkable persistence in a self-directed rehabilitation program, he was able to resume gainful employment after several years. Subsequently, the patient reported hitting his head from a major bicycle accident and hitting his head when he walked into an obstruction at a warehouse. Patient self-referred in May 2011 with complaints of anxiety, depression, intermittent dissociation, decreased ability to concentrate, and memory loss. At the time of referral, the patient had been self-medicating with alcohol and had stopped self-directed rehabilitation.

Care Plan:

The patient was advised to abstain from self-medicating with alcohol. Rx 50 mg Trazadone at night. Self-directed 45 hours of 1.3 atmospheric pressure 90% oxygen.

PET Studies:

Upon referral (May 3, 2011) patient received a Quantitative PET brain study and underwent multiple cognitive and self-reporting psychometric testing during the following 12 month period. On Aug. 18, 2011 (75 days later) the patient received a second Quantitative PET brain study and continued cognitive and psychometric testing. The PET studies were analyzed using a custom neurological software package.

Figures 5A, 5B:
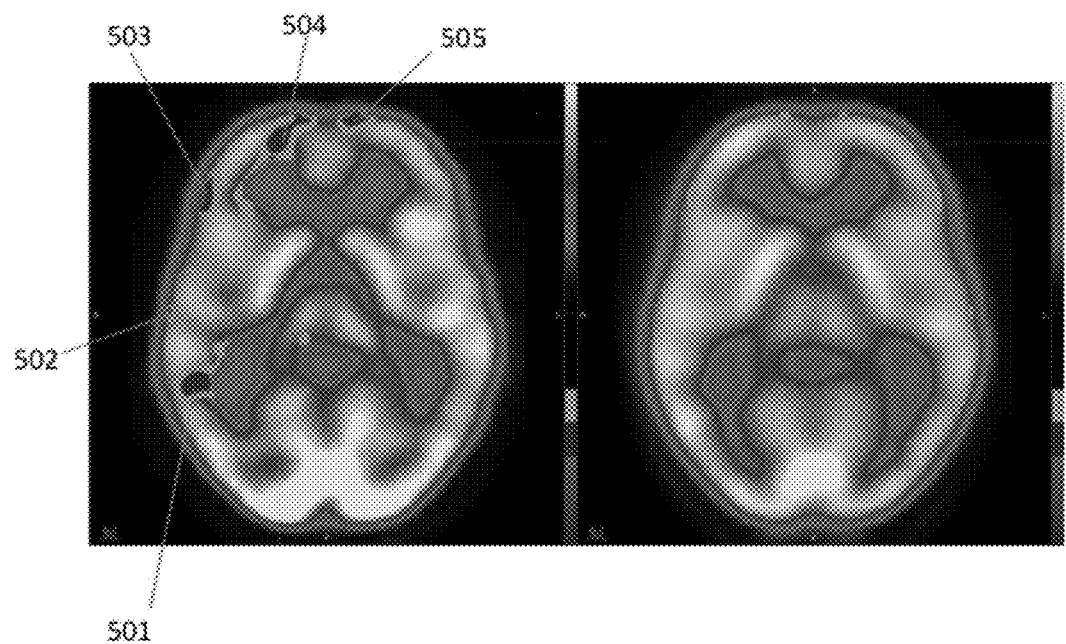
FIG. 5A-5B show comparative quantitative PET images showing significant improvement in Case Study #1 from May 2011 (A) to February 2012 (B) consistent with improved cognitive scores.

Referring to FIGS. 5A and 5B, Comparative Quantitative Imaging showed significant improvement from May 2011 to February 2012 consistent with improved Cognitive scores (Table 1). Significant improvement is noted especially in frontal lobes. Referring to FIG. 5A, the patient's brain is imaged showing areas 501, 502, 503, 504, and 505 with decreased activity. FIG. 5B shows the imaged brain in February 2012, with improvement in those same areas.

RM has had about seventy 1.3 atmosphere hyperbaric treatments since November, 2011. Patient reports mediation 3 to 5 times a week, no drinking, and consistent vitamin B complex use since Nov. 26, 2011. His family and economic stress level are twice as high as compared to a year ago. RM has shown remarkable improvement in frontal lobe PET scan hypometabolism, remarkable improvement in Processing Speed, and significant improvement in Neurocognitive Index.

TABLE 1

| A. Cognitive changes over time for Case Study #1 | | | | | | | | | | | |
|---|---|---|---|---|---|---|---|---|---|---|---|
| | 03-May | 12-Jul | 17-Jul | 21-Jul | 10-Aug | 15-Aug | 17-Aug | 25-Aug | 30-Aug | 09-Nov | 24-Jan |
| NC index | 63 | 68 | 66 | 73 | 81 | 87 | 82 | 93 | 90 | 77 | 70 |
| Comp M | 21 | 40 | 63 | 30 | 45 | 75 | 50 | 90 | 34 | 61 | 55 |
| Verbal M | 12 | 30 | 58 | 63 | 12 | 55 | 63 | 79 | 30 | 37 | 63 |
| Visual M | 45 | 53 | 66 | 13 | 81 | 81 | 37 | 90 | 45 | 75 | 45 |
| Psych motor speed | 86 | 84 | 34 | 96 | 96 | 96 | 98 | 96 | 99 | 94 | 90 |
| RT | 42 | 45 | 70 | 58 | 93 | 95 | 86 | 86 | 93 | 66 | 32 |
| CA | 82 | 82 | 63 | 63 | 58 | 58 | 58 | 70 | 77 | 77 | 82 |
| CF | 70 | 81 | 87 | 90 | 86 | 90 | 96 | 96 | 97 | 78 | 82 |
| Proc speed | 5 | 5 | 13 | 40 | 18 | 34 | 27 | 75 | 53 | 18 | 4 |
| Exec func | 68 | 84 | 86 | 95 | 88 | 93 | 98 | 96 | 97 | 81 | 81 |
| Total | 494 | 572 | 606 | 621 | 658 | 764 | 695 | 871 | 715 | 664 | 604 |
| B. Cognitive changes over time for Case Study #1 (Continuation of Table 1A) | | | | | | | | | | | |
| | 31-Jan | 04-Feb | 06-Feb | 04-Mar | 11-Mar | 21-Mar | 26-Jan | 18-Apr | 23-Apr | 02-May | |
| NC index | 63 | 82 | 82 | 90 | 90 | 84 | 91 | 93 | 93 | 95 | 1713 |
| Comp M | 12 | 70 | 40 | 79 | 70 | 61 | 82 | 70 | 61 | 61 | 1170 |
| Verbal | 16 | 79 | 30 | 90 | 90 | 73 | 63 | 63 | 73 | 63 | 1142 |

TABLE 1-continued

| | | | | | | | | | | | |
|---|---|---|---|---|---|---|---|---|---|---|---|
| M | | | | | | | | | | | |
| Visual M | 18 | 53 | 53 | 53 | 37 | 45 | 86 | 68 | 45 | 53 | 1142 |
| Psych motor speed | 95 | 99 | 99 | 99 | 99 | 99 | 99 | 99 | 99 | 99 | 1955 |
| RT | 58 | 70 | 79 | 73 | 81 | 68 | 82 | 86 | 75 | 75 | 1513 |
| CA | 77 | 70 | 82 | 82 | 82 | 70 | 77 | 70 | 82 | 82 | 1544 |
| CF | 66 | 79 | 87 | 94 | 93 | 81 | 95 | 96 | 96 | 98 | 1838 |
| Proc speed | 25 | 53 | 77 | 53 | 63 | 92 | 75 | 97 | 96 | 99 | 1022 |
| Exec func | 66 | 79 | 86 | 95 | 93 | 79 | 96 | 96 | 96 | 98 | 1851 |
| Total | 496 | 734 | 715 | 808 | 798 | 752 | 846 | 838 | 816 | 823 | |

NC index - Neuro-cognitive index,
Comp M - Composite memory,
Verbal M - Verbal memory,
Visual M - Visual Memory,
Psych motor speed - Psycho-motor speed,
RT - Reaction time,
CA - Complex attention,
C - Cognitive flexibility,
Proc speed - Processing speed,
Exec func - Executive function Case Study #2
NFL Player
  Clinical Diagnosis:
    traumatic brain injury with persistent symptoms: severe headaches, memory loss requiring constant notations in a diary, difficulties with anger and rage, difficulty sleeping, sleepwalking, talking in his sleep, "terrible" "horrible" short-term memory, and perceptions of space closing in on him, especially in crowds.
    He experiences significant visual impairment, as well as severe dizziness if he bends over after exercise. He finds a 45 minute trip on the interstate very difficult. He is chronically frustrated and upset. He is in marital counseling. He has just experienced the third anniversary of his second marriage. He has children by his first marriage ages 24 and 18. He divorced in 2008. He is currently unemployed; applying for social security disability.
  Summary of Brain Surface Visual Findings:
    Cortical confluent hypometabolic areas are seen at the base of the brain centering on the brainstem, pons, cerebellar vermis and cerebellar peduncles. The inferior aspects of cortical and subcortical regions of both temporal lobes are hypometabolic; the medial aspects of both cerebellar hemispheres are involved; there is also significant spotty cortical and subcortical hypometabolism of the inferior aspects of the frontal lobes. Midline images of the brain demonstrate severe extensive hypometabolism of the basal ganglia and midbrain.
  Right Frontal Lobe:
    there is a severely hypometabolic right frontal lobe area measuring 4.9 cm in height by 1.4 cm in width by 1.25 cm in anterior-posterior dimension involving most of the right superior frontal gyms. There is a large area of hypometabolism involving the right inferior frontal gyms pars triangularis measuring 2.5 cm in height by 1.4 cm in width by 1.9 cm in anterior-posterior dimension. The right frontal gyms is hypometabolic; right superior frontal gyrusis hypometabolic; right middle frontal gyms is hypometabolic; right orbitofrontal region including the medial orbital gyms is hypometabolic. Right supplementary motor area is extensively hypometabolic. Right precentral gyms contains a hypometabolic area measuring 2 cm in height by 1.8 cm in width. The right superiormedial frontal gyms is severely hypometabolic measuring 2.8 cm in length by 1.5 cm in width.
  Left Frontal Lobe:
    There is a mirror image hypometabolic area measuring 2.3 cm in height by 0.7 cm in width involving much of the left superior frontal gyms. Hypometabolism is extensive in the left orbitofrontal region including the medial orbital gyms. The left anteriororbital gyms is hypometabolic. The right inferior medial frontal gyms is hypometabolic; left superior frontal gyms measuring 0.7 cm diameter is severely hypometabolic, left middle frontal gyms is hypometabolic. Left supplementary motor area is extensively hypometabolic. Left middle frontal gyms is hypometabolic. Left superior frontal gyms is hypometabolic; left precentral gyms is hypometabolic; left superior frontal gyms is hypometabolic. The left superior medial frontal gyms is severely hypometabolic measuring 2 cm in anterior-posterior dimension and about 1.5 cm in width.
  Insula:
    There is focal hypometabolism within the right insula.
  Right Temporal Lobe:
    Hypometabolism of the inferior aspects of the right temporal lobe extending into the medial area. The right fusiform gyms is extensively hypometabolic; right hippocampus is extensively hypometabolic measuring 2.9 cm in height by 1.3 cm in width by 4.4 cm in oblique anterior-posterior length. Right temporal pole is hypometabolic.
  Left Temporal Lobe:
    Hypometabolism of the inferior aspects of the left temporal lobe extending into the medial area as is the left fusiform gyms. The left temporal pole is hypometabolic; the left fusiform gyms is involved. The left hippocampus is significantly hypometabolic.
  Right Parietal Lobe:
    The right rolandic operculum is hypometabolic; The right super marginal gyms is hypometabolic. The right precentral gyms is hypometabolic. The right posterior cingulate gyms is hypometabolic. The right superior parietal lobule is extensively hypometabolic. The right precentral gyms is hypometabolic. The right superior parietal lobule is extensively and severely hypometabolic. The right angular gyms is hypometabolic as is the right supra-marginal gyms.

Left Parietal Lobe:

The left rolandic operculum is hypometabolic. The left super marginal gyms is hypometabolic; the left precentral gyms is hypometabolic; the left postcentral gyms is hypometabolic; left superiorparietal lobule is hypometabolic; the left pre-post central gyms is hypometabolic; the left superior parietal lobule is very extensively and severely hypometabolic. Left supra marginal gyms is hypometabolic. Left angular gyms is hypometabolic.

Basal Ganglia:

The putamen is hypometabolic bilaterally. The globis pallidus bilaterally is extensively hypometabolic.

Thalamus:

The right thalamus is severely hypometabolic measuring about 3 cm in height by 2.1 cm in anterior-posterior dimension. Left thalamus is severely hypometabolic measuring 4.2 cm in height by 2.2 cm in width.

Right Occipital Lobe:

The right superior occipital gyms shows extensive hypometabolism. There is definite involvement of the right primary visual cortex. The right lingual gyms inferior to the right primary visual cortex is also severely hypometabolic.

Left Occipital Lobe:

There is definite involvement of the left primary visual cortex measuring 2.3 cm in height by 1.3 cm in width, by 2.6 cm in anterior-posterior dimension. There is very extensive involvement of the left primary visual cortex. The left superior occipital gyms has extensive hypometabolism. Adjacent structures in the left occipital lobe are also hypometabolic. The left lingual gyms is hypometabolic and the right superior occipital gyms is hypometabolic; the right fusiform gyms is hypometabolic. The left fusiform gyms and left inferior occipital gyms are focally hypometabolic Cerebellum:

There is extensive hypometabolism involving the right inferior and superior cerebellar peduncles. There is moderately extensive hypometabolism of the left inferior and superior cerebellar peduncles. The midline cerebellar vermis is extensively hypometabolic measuring 2.4 cm in width by 1.14 cm anterior-posterior.

Quantitative Findings:

Areas of the brain where the hypometabolism is so severe and extensive that the average metabolic rate of the entire structure is statistically depressed.

TABLE 2

Areas of extensive hypometabolism in Case Study #2.

| Structure | Midline | Left | Right |
|---|---|---|---|
| base of po | −2.4 SD | | |
| globis pallidus | | −2.2 SD | −2.2 SD |
| superior cerebellar peduncle | | −0.9 SD | −2.1 SD |
| middle cerebellar peduncle | | −1.0 SD | −1.5 SD |
| inferior cerebellar peduncle | | −0.7 SD | −1.8 SD |
| brainstem | −1.4 SD | | |
| thalamus | | −1.3 SD | −1.4 SD |
| primary visual cortex | | −1.3 SD | −1.2 SD |
| lingual gyrus | | −1.0 SD | −1.2 SD |
| amygdala | | −1.2 SD | −0.6 SD |

Example: −2 SD means 97.5% of people function better.

TABLE 3

Percentages of regions of brain showing hypometabolism.

| Contour | Max (z-score) | Min (z-score) | Volume (ml) | % Volume |
|---|---|---|---|---|
| WHOLE BRAIN | 4.21 | −4.91 | 2417.8 | |
| WHOLE BRAIN HYPO | −1.65 | −4.91 | 123.9 | 5.1% |
| Frontal Lobe | 4.21 | −4.91 | 576.9 | |
| Frontal Lobe Hypo | −1.65 | −4.91 | 32.1 | 5.6% |
| Occipital Lobe | 3.66 | −3.94 | 225.7 | |
| Occipital Lobe Hypo | −1.65 | −3.94 | 15.3 | 6.8% |
| Parietal Lobe | 3.71 | −4.77 | 341.8 | |
| Parietal Lobe Hypo | −1.65 | −4.77 | 23.7 | 6.9% |
| Temporal Lobe | 3.66 | 3.94 | 307.3 | |
| Temporal Lobe Hypo | −1.65 | −3.94 | 9.8 | 3.2% |

Hypo: hypometabolism.

Impressions:

This patient demonstrates extensive severe traumatic brain injury in both the right and left sides of his brain. Very severe memory impairment is directly traceable to hypometabolism in both hippocampi, and bilaterally in the thalamus. Visual difficulties are directly traceable to bilateral hypometabolism in the primary visual cortex. Difficulties with emotional self-regulation are directly correlated with hypometabolism in both amygdala, as well as extensive areas of hypometabolism in the frontal cortex bilaterally.

REFERENCES

Ashburner J and Friston K J. Voxel-Based Morphometry— The Methods. Neurolmage 11: 805-821, 2000.

Garcia-Panach J., et al. A voxel-based analysis of FDG-PET in traumatic brain injury: regional metabolism and relationship between the thalamus and cortical areas. J Neurotrauma 28(9): 1707-17, 2011.

Kato T, et al. Statistical image analysis of cerebral glucose metabolism in patients with cognitive impairment following diffuse traumatic brain injury. J. Neurotrauma 24(6): 919-926, 2007.

Mummery C J, Patterson K, Price C J, Ashburner J, Frackowiak R S J, Hodges J R. A voxel-based morphometry study of semantic dementia: relationship between temporal lobe atrophy and semantic memory. Ann Neurol 47:36-45, 2000.

Kim I., et al. Age- and Sex-Associated Changes in Cerebral Glucose Metabolism in Normal Healthy Subjects Statistical Parametric Mapping Analysis of F-18 Fluorodeoxyglucose Brain Positron Emission Tomography. Acta Radiol: 50(10):1169-74, 2009.

Shiga T., et al. A new PET scanner with semiconductor detectors enables better identification of intratumoral inhomogeneity. Journal of Nuclear Medicine 50(1): 148-155, 2009.

Zhang J. et al. Statistical parametric mapping and cluster counting analysis of [18F] FDG-PET imaging in traumatic brain injury. J. Neurotrauma. 27(1): 35-49, 2010.

What is claimed is:

1. A system for assessing the activity of an organ in a test animal subject without comparison to a control animal subject, the system comprising one or more processors, a memory unit, and a non-transitory computer-readable storage medium including computer-readable code that is read by the one or more processors to perform a method comprising the steps of:

a) accessing by one or more computers a quantitative three-dimensional image of the organ of the test animal subject that is represented as voxels, wherein each voxel contains information about the activity of a portion of the same organ;

b) constructing by the one or more computers a histogram of values represented by all voxels, fitting a curve to the histogram, and selecting voxels for inclusion for determining a reference level of activity of the organ if their values fall within a portion of the histogram that is symmetrical about a mean of values represented by all voxels;

c) calculating by the one or more computers a mean of the activity represented by the voxels selected for inclusion in step b) and a standard deviation (SD) of the mean, wherein the mean of the activity represented by the voxels selected for inclusion represents a reference level of activity of the organ of the test subject;

d) rescaling the histogram based on the mean calculated in step c) of the activity represented by the voxels selected for inclusion and fitting a curve to the rescaled histogram of the voxels selected for inclusion in step b);

e) identifying areas of the organ of the test subject having increased activity above the reference level of activity of the organ of the test subject as represented by voxels having activity above a certain standard deviation of the mean calculated in step c), and/or identifying areas of the organ of the test subject having reduced activity below the reference level of activity of the organ of the test subject as represented by voxels having activity below a certain standard deviation of the mean calculated in step c); and f) outputting by the one or more computers to an output device a representation of the organ of the test subject showing areas of the organ having increased activity above the reference level of activity of the organ of the test subject and/or reduced activity below the reference level of activity of the organ of the test subject, thereby assessing the activity of an organ in the test animal subject without comparison to a control animal subject.

2. The system of claim 1, comprising outputting by the one or more computers to the output device a representation of the organ showing areas of the organ having neither increased activity and/or reduced activity.

3. The system of claim 1, wherein in step b) voxels are excluded from the calculation of the mean if the voxels represent values at the upper and lower 5% of the values.

4. The system of claim 1, wherein standard deviation (SD) is calculated in 0.1 SD units between 3.0 SD units below the mean to 3.0 SD units above the mean.

5. The system of claim 1, wherein voxels representing activity above 1.5 SD units above the mean indicate areas of the organ having increased activity and wherein voxels representing activity below 1.5 SD units below the mean indicate areas of the organ having reduced activity.

6. The system of claim 1, wherein the organ is at least one selected from the group consisting of brain, heart, lung, kidney, liver, pancreas, bladder, salivary glands, esophagus, stomach, gallbladder, intestines, colon, rectum, thyroid, parathyroid, adrenal gland, ureter, bladder, urethra, tonsils, adenoids, thymus, spleen, ovary, fallopian tube, uterus, vagina, mammary gland, testes, vas deferens, seminal vesicle, prostate, penis, pharynx, larynx, trachea, bronchi and lung.

7. The system of claim 1, wherein voxels from the one side of an organ are compared with corresponding voxels from an opposite side of the same organ.

8. The system of claim 1, wherein the image of the organ is obtained using positron emission tomography (PET), functional magnetic resonance imaging (fMRI), diffusion tensor magnetic resonance imaging, magnetic resonance imaging of any form, single photon emission computed tomography (SPECT) magnetic source imaging or optical imaging.

9. The system of claim 1, wherein three dimensional imaging of the organ is obtained using positron emission tomography (PET) in connection with a computed tomography (CT) X-ray scan.

10. The system of claim 1, wherein three dimensional imaging of the organ is obtained using positron emission tomography (PET) in connection with any magnetic resonance scan.

11. The system of claim 1, wherein areas of increased or reduced activity in the organ indicate a disease, an injury, a response to an injury, or functional changes in areas that have been disconnected from the remainder of the brain or spinal cord because of injury to connective structures.

12. The system of claim 11, wherein the disease or injury is a tumor, stroke, infection, demyelinating disease, degenerative disease, dementia, ischemia, traumatic injury, shock wave injury, or primary or metastatic cancer.

13. The system of claim 11, wherein the organ is the brain and areas of reduced activity in the organ represent diffuse axonal injury.

14. The system of claim 1 comprising determining a ratio of a number of voxels showing increased activity to a number of voxels showing decreased activity within an area of disease or injury.

15. The system of claim 1 comprising determining a ratio of a number of voxels showing increased activity to a number of voxels showing decreased activity at a border region between an area of disease or injury and normal tissue.

16. The system of claim 1, wherein an image of the organ is obtained and analyzed at a plurality of time points.

17. The system of claim 16, wherein images at different time points are used to evaluate effectiveness of a course of treatment of a subject or to evaluate progression of disease.

18. The system of claim 16, wherein an image of the brain is obtained and analyzed at a plurality of time points during neurological surgery or during neurological intensive care.

19. The system of claim 16, wherein an image of the heart is obtained and analyzed at a plurality of time points during cardiac surgery, during cardiac interventional procedures, or during cardiac intensive care.

20. The system of claim 16, wherein voxels within an area of disease or injury in the organ are analyzed at a plurality of time points, and a ratio of a number of voxels within the area showing increased activity over time to a number of voxels within the area showing decreased activity over time is a measure of whether the disease or injury is improving or not improving.

21. The system of claim 20, wherein the disease is cancer and wherein a decrease in the ratio of the number of voxels within the area of disease showing increased activity over time to the number of voxels within the area of disease showing decreased activity over time is indicative of a favorable outcome.

22. The system of claim 20, wherein the disease is reduced blood flow to the area and wherein an increase in the ratio of the number of voxels within the area showing increased activity over time to the number of voxels within the area showing decreased activity over time is indicative of a favorable outcome.

23. The system of claim 1, wherein the subject is a human.

24. The system of claim 1, wherein the non-transitory computer-readable storage medium includes computer-readable code to image the subject or to obtain an image of the organ.

* * * * *